United States Patent Office 2,822,238

Patented Feb. 4, 1958

1

2,822,238

SURFACTANT TREATMENT OF MICROBALLOONS TO IMPROVE WATER RESISTANCE

Richard D. Croft, Chagrin Falls, and Franklin Veatch, Lyndhurst, Ohio, assignors to The Standard Oil Company, Cleveland, Ohio, a corporation of Ohio No Drawing. Application December 31, 1954 Serial No. 479,251

9 Claims. (Cl. 21—60.5)

The present invention relates to the inhibition of the evaporation of volatile non-aqueous liquid products by a floating layer comprising small, hollow, hole-free particles which have been treated with a water-insoluble, ionic, surface-active agent.

Copending application S. N. 389,472, filed October 30, 1953, discloses that the evaporation loss of volatile products can be effectively decreased and inhibited by floating thereon a layer of individual, small, hollow, gas filled, hole-free particles of a material inert to the volatile product, which particles have an average diameter of less than 500 microns and a liquid displacement density of from 0.05 to 0.6.

These particles will spread out upon the surface of a volatile non-aqueous liquid to form a layer of uniform thickness. An inspection of this layer will show that the particles are tightly packed together and this layer prevents evaporation of the liquid. It has been found, however, that exposure to moisture such as that normally found in the atmosphere will alter the characteristics of the layer. The water-wetted particles will begin to agglomerate whereby the layer will assume an uneven appearance. After further exposure to moisture or rain, agglomeration will continue until openings in the layer develop. Agglomeration is accompanied by an increase in the rate of evaporation, thereby defeating the purpose for using the particles. Ultimately the proportion of water in the layer may become so large that, where the volatile liquid covered has a density lower than water, the water, carrying entrained particles, will sink.

It has been observed that those particles which have been exposed to rain or humid atmospheric conditions do not pack together as uniformly and tightly as in the absence of moisture, nor are they as easily wetted by the volatile non-aqueous liquids. It has also been observed that the ability of a layer of these particles to inhibit evaporation is directly related to the ability of the particles to be wetted preferentially by the volatile non-aqueous liquids as opposed to being wetted by water. In other words, the sensitivity of these particles to moisture impairs their ability to inhibit the evaporation of volatile liquids.

Accordingly, it is an object of the present invention to provide small, hollow, hole-free particles having a lower sensitivity to water.

Another object is to provide methods for treating hollow, hole-free particles whereby said particles are rendered less sensitive to water.

Still another object is to reduce the rate of evaporation of volatile non-aqueous liquids by means of placing thereover a layer of small, hollow, hole-free particles of low water sensitivity.

These and other objects, as well as the utility and advantages of the invention, will become apparent from the following detailed description.

It has now been found that small, hollow, hole-free

2 particles of the type mentioned above can be rendered less sensitive to water by treating them with an appreciable amount up to forty percent, based on the weight of said particles, of an ionic, water-insoluble, surface-active agent. Not only are these treated particles less sensitive to water but, surprisingly, their use as a floating layer over volatile non-aqueous liquids will substantially reduce the rate of evaporation as compared with a layer of untreated particles.

The use of hollow particles with a very small amount of surface-active agent will give some improvement over untreated particles. Substantial improvements have been observed with about 0.1% agent which is approximately an amount sufficient to provide a monomolecular coating over the hollow particles. Surprisingly, continued improvements are possible when the amount is increased to ten percent and even to forty percent. Accordingly, the upper limit will be influenced more by economical than by technical considerations.

The ionic surface-active agent of the present invention may be anionic or cationic. All must be characterized by a molecular structure so as to be chemically inert to and insoluble in water. Water insolubility is recognized as a relative term. Thus, in this invention, water-insoluble surface-active agents also include those agents which are only slightly soluble in water. Operable agents will resist the leaching effect of water, such as by rain falling onto a floating layer of treated particles, thereby giving a floating layer which will not readily deteriorate in the presence of moisture. Generally, the surface-active agents of the present invention are oil soluble, but the latter is not a criterion of operativeness. Operable anionic surface-active agents include water-insoluble carboxy acids, sulfuric esters, alkane sulfonates and alkyl aromatic sulfonates. Cationic surface agents include amino and quaternary ammonium compounds. These types of surface-active agents are well known and described in numerous books and publications. Results from the use of an amine salt of a long-chain aliphatic alcohol sulfate, sold by E. I. du Pont de Nemours & Co., known by the trademark Duponol OS, a clear amber, oily, water-insoluble liquid, are typical.

Application Serial No. 383,908, filed October 2, 1953, describes the small, hollow, gas filled, hole-free particles and methods of making the same, and this disclosure to the extent deemed necessary is incorporated by reference. To understand the present invention it is believed necessary here to say only that the particles may be made from any film-forming material, natural or synthetic. The preferred method is to spray dry a solution of the material containing a blowing agent. Most of the materials, especially those formed from a water solution, while wettable to some extent either by non-aqueous liquids or water, are preferentially wettable by water. The present invention is intended to cover all such film-forming materials and especially for those film-forming materials from whose surfaces water will displace the substrate liquid.

The non-aqueous volatile liquids to be protected include hydrocarbons, such as gasoline, kerosene, and crude oil, halogenated derivatives of hydrocarbons such as carbon tetrachloride or perfluoroheptane, and esters and ethers such as ethyl acetate and diethyl ether. These liquids seldom contain more than traces or minor amounts of water and are not miscible with any substantial portion of water. The presence of such minor amounts of water does not appreciably affect the rates of evaporation of these liquids when covered with a floating layer of hollow particles treated in accordance with the present invention.

There are several methods for treating the small particles with the surface-active agent. First, the surface-active agent may be incorporated in the composition which is spray dried to produce these particles. Second, the surface-active agent and particles may be mixed together by any conventional means, such as by spraying the surface-active agent or a solution thereof on the particles or by immersing the particles in the surface-active agent or a solution thereof. Third, the agent might be added to a foam in the form of a slurry of these particles in a non-aqueous liquid, such as the volatile non-aqueous liquid to be covered. Fourth, the surface-active agent may be added directly to the volatile non-aqueous liquid to be covered and will be absorbed on the surface of the particles.

By treatment with a surface-active agent, the wetting preference of these particles for water is reduced as compared to their preference for the liquid to be protected. Tests indicate that evaporation loss reduction occasioned by the use of these treated particles is substantially greater than with untreated particles.

The invention will be illustrated by the following examples. Except where otherwise mentioned, the small, hollow, hole-free, gas filled particles used were produced from a phenol-formaldehyde resinous composition by spray drying, as described heretofore.

EXAMPLES 1–7

Mixtures of water-insoluble surface-active agents and technical grade toluene were covered to a depth of 0.5 inch with particles previously exposed to a humid atmosphere, and the wetting effect was noted. Results are shown in Table I.

*Table I*

| Example | Surface Active Agent | Percent Surface Active Agent based on Weight of Toluene | Type of Surface Active Agent | Wetting Effect on Particles |
|---|---|---|---|---|
| 1 | None | | | None. |
| 2 | Glycerol mono-laurate.[1] | 0.5 | Nonionic | Do. |
| 3 | Oleic Acid | 0.5 | Anionic | Satisfactory. |
| 4 | 2 Ethyl Hexoic Acid. | 0.5 | do | Do. |
| 5 | Amine 220 [2] | 0.5 | Cationic | Very Good. |
| 6 | Duponol OS [3] | 0.5 | Anionic | Do. |
| 7 | Duponol OS | 1.0 | do | Excellent. |

[1] This example illustrates why operable surface-active agents in the present invention exclude nonionic agents.
[2] 1 β-hydroxyethyl 2-heptadecenyl glyoxalidine, sold by Union Carbide and Carbon Corporation.
[3] Amine salt of a long-chain aliphatic alcohol sulfate, sold by E. I. du Pont de Nemours & Co.

These examples show that the water-insoluble, ionic, surface-active agents do improve the ability of the particles to be "wetted" preferentially by toluene. Examples 1 and 7 were allowed to stand overnight. An appreciably greater volume of toluene was lost by evaporation from Example 1, thereby indicating the ability of a wetted layer of particles to reduce the rate of evaporation. This ability was further tested in Example 8.

EXAMPLE 8

The unexpected ability of a floating layer of treated particles to reduce evaporation losses as compared with a layer of untreated particles and also with no layer was tested by measuring the respective volumes lost after storage for a period of one week of a regular grade gasoline, a straight run naphtha, and a tractor fuel. The layer was produced by making a slurry of a batch of particles sufficient to provide a one-inch thick layer with the product to be covered. Duponol OS in an amount equal to 2%, based on the weight of particles, was added to the slurry when treated particles were required. Results are shown in Table II.

*Table II*

| Product Covered | Percent by Volume of Original Product Lost When Covered By— | | | Evaporation Loss Reduction in Percent |
|---|---|---|---|---|
| | None | Untreated Particles | Treated Particles | |
| Gasoline | 46 | 46 | 23 | 50 |
| Tractor Fuel [1] | 36 | 29 | 10.5 | 64 |
| Straight Run Naphtha | 54 | 50 | 25 | 50 |

[1] Blend of equal volumes of gasoline and kerosene.

These tests show that untreated particles have a slight inhibiting action on evaporation and that treated particles will reduce evaporation by as much as 50% or more.

EXAMPLES 9–14

To determine the effect on rate of evaporation of floating layers comprising varying amounts of particles and surface-active agents, six samples having the following composition were prepared by making a slurry of gasoline, particles, and Duponol OS, and adding the slurry to gasoline:

| Example Nos. | Parts by Weight of Components | | | |
|---|---|---|---|---|
| | Gasoline | Particles | Duponol OS | Total |
| 9 | 646 | none | none | 646 |
| 10 | 577 | 23 | none | 600 |
| 11 | 612 | 23 | [1] 0.05 | 635 |
| 12 | 581 | 23 | 1 | 605 |
| 13 | 567 | 23 | 9 | 599 |
| 14 | 500 | 46 | 18 | 564 |

[1] Enough for monomolecular coating of all particles.

The thickness of the particle layer was one inch in samples 10–13 and two inches in sample 14. These samples were allowed to stand and the cumulative loss of gasoline was noted.

*Table III*

| Cumulative Time in Hours | Cumulative Volume Lost by Evaporation Percent of Original Volume | | | | | |
|---|---|---|---|---|---|---|
| | Example No. | | | | | |
| | 9 | 10 | 11 | 12 | 13 | 14 |
| 2 | 8 | 3.3 | 2.5 | 2.2 | 1.8 | 1.6 |
| 18 | 49 | 26 | 15.6 | 13.6 | 8.1 | 5.7 |
| 20.5 | 50 | 28 | 17.5 | 15.5 | 8.9 | 6.1 |
| 24 | 51 | 32 | 20 | 18 | 10.2 | 6.8 |
| 26 | 52 | 35 | 22 | 19 | 10.7 | 7.3 |
| 42 | 57 | 50 | 33 | 29 | 15.6 | 9.8 |

The data not only show that a layer of particles will reduce evaporation rates, but, surprisingly, that their effectiveness in this respect is markedly improved by the concurrent use of small amounts of a surface active agent. The use of such an agent in Sample 11, namely an amount equal to 0.22% by weight of the particles, was sufficient to reduce the rate of evaporation to the extent that about 42 hours were required before the volume lost (33%) was about equal to that lost (32%) in 24 hours when using untreated particles. Where the amount of agent was 39%, evaporation rates were reduced by a factor of about 9, that is, it required 18 hours for 8.1% evaporation in Example 13, as compared with only 2 hours for the same evaporation (8%) in Example 9.

In comparing the evaporation of volatile components from a liquid mixture, it must be remembered that the rate of evaporation will decrease as the more volatile components evaporate. The significance of evaporation loss data is sometimes more easily visualized by showing the time required for a given proportion of a liquid mixture to be lost through evaporation. Table IV shows the hours required for the evaporation of 10, 20, and 30% by volume of the gasoline in each of Examples 9–14, inclusive, the values being obtained from a graph of the data in Table III.

*Table IV*

| Example No. | Hours for Evaporation of— | | |
|---|---|---|---|
| | 10% | 20% | 30% |
| 9 | 2 | 4 | 6 |
| 10 | 6 | 13 | 21 |
| 11 | 10 | 23 | 37 |
| 12 | 12 | 27 | 43 |
| 13 | 23 | (54) | (92) |
| 14 | [1] (43) | (133) | (>200) |

[1] () designates extrapolated values.

The data in Table IV clearly show the marked reduction in evaporation loss rates possible by the use of treated particles (Examples 11–14) as compared with untreated particles (Example 10) and with no particles (Example 9). Examples 12–14 surprisingly show that the use of particles treated with an amount of surface active agent in excess of that required for a monomolecular coating of the particles causes a further substantial reduction in the rate of evaporation loss.

EXAMPLES 15–17

In these examples a solution comprising 90% by volume of kerosene and 10% of a solvent-extracted bright stock was prepared, and 400 ml. thereof was placed in each of three different 1000 ml. beakers. The surface of each sample was covered with particles to a depth of about 0.5 inch. The surface active agent was added to each of two beakers in the form of a 5% solution in kerosene whereby the total amount of agent was equal to approximately 2% by weight of the particles. After standing overnight, the three beakers were treated as follows:

Each day twelve successive applications of 5 ml. of water were made dropwise on each sample over a period of approximately four hours, and the condition of the floating layers noted. This method was followed daily until each floating layer had broken, thereby leaving the surface of the underlying hydrocarbon exposed. The total amount of water added in order to break the layer was used as a criterion of the effectiveness of the wetting agents. The results are set forth below in Table V.

*Table V*

| Example No. | Surface-Active Agent | ml. of Water Required to Break Layer of Particles |
|---|---|---|
| 15 | None | 110 |
| 16 | Duponol OS | 160 |
| 17 | Lecithin | 220 |

Both wetting agents showed improvement over the blank, lecithin being the most effective.

While the invention has been described with reference to specific embodiments, it will be apparent to those skilled in the art that various modifications may be made and the equivalent substituted therefor without departing from the principles and true nature of the present invention.

We claim:

1. In the method of inhibiting evaporation of volatile non-aqueous liquid products which comprises covering the surface of said products with a floating layer of individual and separate, small, hollow, gas-filled, hole-free particles of a solid material inert to said volatile product and preferentially wet by water, which particles have an average diameter of less than 500 microns and a liquid displacement density of from 0.05 to 0.6, the improvement which comprises contacting said particles with a water-insoluble, ionic, surface-active agent in an amount less than 40% by weight of said particles to render said particles less sensitive to water.

2. The method of claim 1 in which the particles are formed from a resin obtained by condensing formaldehyde with a compound selected from the group consisting of phenol and urea.

3. The method of claim 1 in which said agent is an aliphatic water-insoluble alcohol sulfate.

4. In a method of preparing a material adapted to be applied to a volatile liquid to inhibit the evaporation thereof, the step of contacting individual and separate, small, hollow, gas-filled, hole-free particles of a solid material inert to said liquid and preferentially wet by water, which particles have an average diameter of less than 500 microns and a liquid displacement density of from 0.05 to 0.6, with an amount less than 40% by weight of said particles of a water-insoluble, ionic, surface-active agent to render said particles less sensitive to water.

5. The method of claim 4 in which the particles are contacted with the surface-active agent dissolved in a water-immiscible solvent.

6. The method of claim 5 in which the solvent is the volatile liquid to be protected.

7. The method of claim 4 in which the particles are formed from a resin obtained by condensing formaldehyde with a compound selected from the group consisting of phenol and urea.

8. A material adapted to inhibit the evaporation of a volatile liquid, comprising individual and separate, small, hollow, gas-filled, hole-free particles of a solid material inert to said liquid and preferentially wet by water, which particles have an average diameter of less than 500 microns and a liquid displacement density of from 0.05 to 0.6, having on their surface an amount less than 40% by weight of a water-insoluble, ionic, surface-active agent to render said particles less sensitive to water.

9. The material of claim 8 in which the particles are formed from the condensate of formaldehyde with a compound selected from the group consisting of phenol and urea.

References Cited in the file of this patent

UNITED STATES PATENTS

| | | |
|---|---|---|
| 1,415,351 | Howard | May 9, 1922 |
| 1,415,352 | Howard | May 9, 1922 |
| 1,479,790 | Davis | Jan. 8, 1924 |
| 1,985,491 | Fisher | Dec. 25, 1934 |
| 2,101,635 | Bender | Dec. 7, 1937 |
| 2,170,644 | Nelson | Aug. 22, 1939 |

FOREIGN PATENTS

| | | |
|---|---|---|
| 200,855 | Great Britain | July 26, 1923 |

OTHER REFERENCES

De Ment: Abstract of application S. N. 301, pub. June 30, 1953, 671 O. G. 1497.

UNITED STATES PATENT OFFICE

CERTIFICATE OF CORRECTION

Patent No. 2,822,238 February 4, 1958

Richard D. Croft et al.

It is hereby certified that error appears in the above numbered patent requiring correction and that the said Letters Patent should read as corrected below.

In the heading to the printed specification, lines 2 and 3, title of invention, for "SURFACTANT TREATMENT OF MICROBALLOONS TO IMPROVE WATER RESISTANCE" read -- SURFACTANT TREATMENT OF SMALL, HOLLOW, HOLE-FREE PARTICLES TO IMPROVE WATER RESISTANCE.

Signed and sealed this 3rd day of June 1958.

(SEAL)

Attest:

KARL H. AXLINE

Attesting Officer

ROBERT C. WATSON

Commissioner of Patents